United States Patent
Johnsen

(10) Patent No.: US 9,592,897 B2
(45) Date of Patent: Mar. 14, 2017

(54) SUPPORT OF PROPELLER UNIT FOR A VESSEL

(75) Inventor: Gunnar Johnsen, Ulsteinvik (NO)

(73) Assignee: Rolls-Royce Marine AS, Ulsteinsvik (NO)

(*) Notice: Subject to any disclaimer, the term of this patent is extended or adjusted under 35 U.S.C. 154(b) by 914 days.

(21) Appl. No.: 13/321,174

(22) PCT Filed: May 12, 2010

(86) PCT No.: PCT/NO2010/000175
§ 371 (c)(1),
(2), (4) Date: Jan. 18, 2012

(87) PCT Pub. No.: WO2010/134820
PCT Pub. Date: Nov. 25, 2010

(65) Prior Publication Data
US 2012/0122356 A1    May 17, 2012

(30) Foreign Application Priority Data
May 20, 2009    (NO) .................................... 20091964

(51) Int. Cl.
*B63H 23/24*    (2006.01)
*H02K 7/09*    (2006.01)
(Continued)

(52) U.S. Cl.
CPC ........... *B63H 23/24* (2013.01); *F16C 39/063* (2013.01); *H02K 7/09* (2013.01); *B63H 1/16* (2013.01);
(Continued)

(58) Field of Classification Search
CPC ....................................................... H02K 7/09
(Continued)

(56) References Cited

U.S. PATENT DOCUMENTS

| 5,078,628 A | 1/1992 | Garis, Jr. |
| 5,185,545 A | 2/1993 | Veronesi |
| (Continued) | | |

FOREIGN PATENT DOCUMENTS

| CN | 1897417 | 6/2007 |
| CN | 200982347 | 11/2007 |
| (Continued) | | |

OTHER PUBLICATIONS

Office Action of Dec. 2, 2013 from the China Patent Office, together with English translation of the office action and search report, submitted, inter alia, as a statement of relevance for all non-English references cited therein.

*Primary Examiner* — Thomas Truong
(74) *Attorney, Agent, or Firm* — Christian D. Abel

(57) ABSTRACT

The present invention relates to a rim driven propeller unit for a vessel, where a number of permanent magnets (4) are arranged round the propeller unit's rotatable rotor housing (1), comprising a number of propeller blades (3), and a number of permanent magnets round the propeller unit's external, stationary casing (2) housing the rotatable rotor housing, where the permanent magnets round parts of the rotatable rotor housing and the external, stationary casing's circumference are provided located above one another with like polarity, while other parts of the rotatable rotor housing and the external, stationary casing are provided located facing one another with opposite polarity, whereby the rotor housing and the stationary casing are repelled by and attracted to one another respectively, thereby being prevented from coming into contact with one another.

10 Claims, 4 Drawing Sheets

(51) Int. Cl.
*F16C 39/06* (2006.01)
*B63H 1/16* (2006.01)
*B63H 23/00* (2006.01)
*F16C 17/02* (2006.01)
*F16C 32/04* (2006.01)

(52) U.S. Cl.
CPC ........ *B63H 2023/005* (2013.01); *F16C 17/02* (2013.01); *F16C 32/0425* (2013.01); *F16C 39/066* (2013.01)

(58) Field of Classification Search
USPC .............. 310/90.5, 103, 104; 290/44, 54, 55
IPC ....................................................... H02K 7/09
See application file for complete search history.

(56) References Cited

U.S. PATENT DOCUMENTS

| | | |
|---|---|---|
| 5,220,231 A | 6/1993 | Veronesi |
| 5,252,875 A | 10/1993 | Veronesi et al. |
| 5,306,183 A | 4/1994 | Holt |
| 5,408,155 A | 4/1995 | Dickinson et al. |
| 5,607,329 A | 3/1997 | Cho |
| 6,369,476 B1 * | 4/2002 | Sung et al. ................. 310/90.5 |
| 2003/0137149 A1 | 7/2003 | Northrup et al. |
| 2003/0194922 A1 | 10/2003 | Van Dine |
| 2009/0278357 A1 * | 11/2009 | Williams ....................... 290/53 |
| 2011/0110770 A1 * | 5/2011 | Spooner et al. ............ 415/173.1 |

FOREIGN PATENT DOCUMENTS

| | | |
|---|---|---|
| EP | 11739007 | 5/2011 |
| GB | 2440400 A | 1/2008 |
| JP | H05(1993)-089944 | 12/1993 |
| JP | H06(1994)-022499 | 1/1994 |
| JP | H10(1998)-331849 | 12/1998 |
| JP | H11(1999)-245889 | 9/1999 |
| NO | 322779 Y | 12/2006 |
| WO | 0928738-X | 7/1999 |
| WO | WO 99/37912 A | 7/1999 |
| WO | WO 2008006602 A1 * | 1/2008 |
| WO | WO 2009130020 A1 * | 10/2009 |

* cited by examiner

SUPPORT OF PROPELLER UNIT FOR A VESSEL

The present invention relates to support of a propeller unit for a vessel, and more particularly the present invention relates to support of a rim driven propeller unit, where the propeller unit's permanent magnets are employed as a part of the propeller unit's support. The permanent magnets, which are arranged so as to form a radial support of the propeller unit, will interact with the propeller unit's axial bearings, thereby together forming an axial and radial support of the propeller unit.

The permanent magnets, which form a radial support of the propeller unit, interact with axial bearings, thereby together forming an axial and radial support of the propeller unit.

A vessel's propeller unit will be subjected to greater or lesser loads when the vessel moves through the mass of water. On account of turbulence in the water and/or the waves, the mass of water passing through the propeller unit will form a varied pressure distribution over the propeller unit, thereby subjecting the propeller unit to greater or lesser vibrations. The vibrations could cause a number of the propeller unit's components and/or elements, and especially the bearings, to be exposed to substantial wear. This will result in a shortening of the effective life of the components and/or the elements, making it necessary to carry out more frequent checks and/or maintenance on the propeller unit. In addition the vibrations to which the propeller unit is subjected could also be transmitted to the vessel on which the propeller unit is mounted, resulting in discomfort for the crew and passengers on board the vessel.

A number of solutions have therefore been developed which are intended to remedy one or more of the above problems or drawbacks, for example, by the mass of water being guided in a special manner through the propeller unit, by the propeller unit's support etc., thereby resulting in the creation of less pressure differences and/or turbulence in the mass of water passed and thereby also less wear on components or elements and less vibrations in both vessel and propeller unit.

In U.S. Pat. No. 5,408,155 support of a vessel's propeller unit is described, where the propeller unit comprises a radial and axial bearing assembly. The contact surfaces between the propeller unit's rotating and stationary parts are coated with a material of greater hardness than the underlying materials. By coating the various parts with a harder material, the propeller unit's parts will be exposed to less wear.

An object according to the present invention is to provide a rim driven propeller unit for a vessel, which propeller unit is not subjected to major vibrations, with the result that the propeller unit's components are exposed to less wear.

Another object of the present invention is to provide a propeller unit where permanent magnets are employed in order to form a bearing which can absorb both axial and radial loads to which the propeller unit is subjected.

These objects are achieved with a bearing device as indicated in the following independent claim, where further features of the invention will become apparent from the dependent claims and the description below.

The present invention relates to support of a propeller unit in a vessel, where the propeller unit comprises a stationary casing. In the stationary casing a rotatable rotor housing is mounted. A number of propeller blades are furthermore attached to the rotor housing through a hub and the rotor housing's internal circumference. Since the rotor housing with the propeller blades will rotate during operation of the vessel, the rotor housing is rotatably mounted in the casing. This is accomplished by arranging a number of permanent magnets round an external circumference of the rotor housing, which permanent magnets round the rotor housing interact with and are influenced by a number of permanent magnets which are arranged round an internal circumference of the propeller unit's stationary casing.

The permanent magnets may be arranged round the entire or parts of the rotatable rotor housing and/or the stationary casing's circumference. The permanent magnets will preferably be arranged round the entire external circumference of the rotatable rotor housing, while round the stationary casing's internal circumference permanent magnets will only be arranged in the area or areas where most wear is expected. This may be, for example, in the casing's lower area (i.e. the area which projects furthest down into the water under the vessel) and in an area opposite to this (i.e. in the casing's upper area). This is due to the fact that, on account of its weight, the rotatable rotor housing will be "pulled" down towards the stationary casing's lower area (the bottom of the casing).

The permanent magnets may, for example, be attached to the stationary casing and the rotatable rotor housing by gluing, screwing or the like.

The contact surfaces of the permanent magnets which are arranged round the rotatable rotor housing and the stationary casing will then preferably be coated with a bearing material, whereupon the rotatable rotor housing and the stationary casing are assembled by the rotatable rotor housing being inserted in the stationary casing. In this case the contact surfaces of the permanent magnets should be understood to be the surfaces which are facing each other when the permanent magnets are arranged round the entire or parts of the rotatable rotor housing's external circumference and the stationary casing's internal circumference. The bearing material may be composed of a type of material which is different to the material of which the permanent magnets are made, preferably a material which is resistant to wear, so that the permanent magnets are exposed to a lesser extent to wear during use of the propeller unit. The bearing material may furthermore also be provided round all of the permanent magnets' surfaces, with the result that the permanent magnets in the rotatable rotor housing and/or the stationary casing are completely enveloped by the bearing material.

The arrangement of the permanent magnets round the external circumference of the rotatable rotor housing and the internal circumference of the stationary casing may be implemented in different ways: in an embodiment of the present invention the permanent magnets which are arranged round the entire or parts of the rotatable rotor housing and the stationary casing are of the same polarity, for example the permanent magnets are made as a negative pole (N-pole). This will have the result that the permanent magnets in the rotatable rotor housing and the stationary casing will attempt to repel one another round the entire or parts of the circumference of the two elements, thereby preventing contact between the rotatable rotor housing and the stationary casing.

In an embodiment of the present invention the permanent magnets which are arranged round the rotatable rotor housing's external circumference may be of the same polarity, while the permanent magnets which are arranged round the internal circumference of the stationary casing will be able to be divided up into areas with different polarity. For example, in an area between 145 degrees and 215 degrees on the stationary casing, where zero degrees is defined as a top point on the rotatable rotor housing in the propeller unit's mounted position, permanent magnets of the same polarity as the permanent magnets arranged round the rotatable rotor housing's external circumference may be provided. This will mean that, when the propeller unit is in operation, the rotatable rotor housing with the propeller blades, which rotates internally in the stationary casing, will always have an area, which area is located in the "bottom" of the stationary casing, where the permanent magnets in the rotatable rotor housing and the stationary casing will be of the same polarity, whereby their polarity will attempt to push the rotatable rotor housing "upwards" in the stationary casing, thereby preventing the rotatable rotor housing and the stationary casing from being brought into contact with each other in this area, and thereby avoiding wear on the bearing material.

In a further embodiment of the present invention the permanent magnets which are arranged round the rotatable rotor housing's external circumference are of the same polarity, i.e. only magnetised north poles or south poles. Round the internal circumference of the stationary casing, in an area between 35 degrees and 325 degrees, where zero degrees is defined as corresponding to a top point on the rotatable rotor housing in the propeller unit's mounted position, permanent magnets may be provided which have opposite polarity to the permanent magnets which are arranged round the rotatable rotor housing's external circumference. Furthermore, in an area between 145 degrees and 215 degrees of the stationary casing, where zero degrees is defined as a top point on the rotatable rotor housing in the propeller unit's mounted position, permanent magnets may be provided of the same polarity as the permanent magnets which are arranged round the rotatable rotor housing's external circumference. With this embodiment, in its lower area, the stationary casing will attempt to repel the rotatable rotor housing from the stationary casing in this area, since it has the same polarity as the permanent magnets arranged round the rotatable rotor housing's external circumference, while in the stationary casing's upper area the permanent magnets in the stationary casing and the rotatable rotor housing will attempt to attract one another on account of their opposite polarity. The rotatable rotor housing will therefore be in contact with the stationary casing to a far lesser extent during the propeller's operation, thereby exposing the permanent magnets which form the propeller unit's bearings to less wear.

In yet another embodiment of the present invention permanent magnets may be mounted round the internal circumference of the stationary casing in an area between 145 degrees and 215 degrees, where zero degrees is defined as corresponding to a top point on the rotatable rotor housing in the propeller unit's mounted position, where the permanent magnets have the same polarity as the permanent magnets arranged round the external circumference of the rotatable rotor housing, whereby the permanent magnets arranged in the stationary casing and in the rotatable rotor housing in this area will attempt to repel one another. The rotatable rotor housing will therefore not come into contact with the stationary casing in this area.

In a further embodiment of the present invention permanent magnets may be arranged in several sets or rows round the circumference of the rotatable rotor housing and the stationary casing, where the sets of permanent magnets are arranged at a distance from one another in the rotatable rotor housing's and the external, stationary casing's longitudinal direction as shown in FIG. 5A. The permanent magnets in the external, stationary casing and the rotatable rotor housing will then preferably be arranged so as to form a closed "ring" round the circumference of the external, stationary casing and the rotatable rotor housing, and the sets of permanent magnets in the rotatable rotor housing and the external, stationary casing are further arranged located above one another as further shown in FIG. 5A. Alternatively, as shown in FIG. 5B, several sets or rows of the permanent magnets may be arranged round an outer circumference of the rotatable rotor housing so as to form a closed "ring", while the several sets or rows of permanent magnets in the external, stationary housing are only arranged at a lower area of the external, stationary housing.

In a preferred embodiment of the present invention two sets of permanent magnets are arranged, located beside each other in the rotatable rotor housing's longitudinal direction, round the external circumference of the rotatable rotor housing. One set may then be provided with negative polarity, while the other set will be provided with positive polarity. In a similar manner two sets of permanent magnets, located beside each other in the stationary casing's longitudinal direction, will also be provided round the internal circumference of the stationary casing, where one set of permanent magnets will be provided with negative polarity, while the other set of permanent magnets will be provided with positive polarity. Thus in this case the two sets of permanent magnets which are arranged on the rotatable rotor housing and in the stationary casing will be arranged in such a manner that, when the propeller unit is assembled, the sets with negative polarity will be located above each other, with the result that the sets with positive polarity will also be located above each other. The two sets of permanent magnets are preferably arranged in or close to each end of the stationary casing's and the rotatable rotor housing's openings.

Alternatively, two sets of permanent magnets may be arranged in or close to each end of the rotor housing/casing, while a further two sets of permanent magnets may be arranged in an area round the middle of the rotor housing's/casing's longitudinal direction, in order thereby to further support or mount the rotatable rotor housing relative to the stationary casing. It should be understood, however, that only one set of permanent magnets may be employed, that several sets of permanent magnets may be arranged along the rotor housing's/casing's longitudinal direction, etc. This will depend on the loads to which the propeller unit is subjected, use of bearing material etc., where a person skilled in the art will know how this should be done in each individual case.

The above-mentioned angular areas for placing or arranging the permanent magnets on the rotatable rotor housing and/or the stationary casing are preferred embodiments of the present invention, and it should therefore be understood that further variations of these angular areas may be possible.

In the embodiments of the present invention indicated above a bearing material, such as that indicated above, will be provided on the permanent magnets. The bearing material will then be able to cover the entire or parts of the surface of the permanent magnets. For example, in the embodiments which only cover the use of one set of permanent magnets in the stationary casing and the rotatable rotor housing, a bearing material may be provided on the surfaces of the permanent magnets facing one another, while in the embodiments comprising several sets of permanent magnets arranged beside one another, the permanent magnets' lateral surfaces may also be covered by the bearing material. By coating the permanent magnets with the bearing material, it will be the bearing material that is exposed to wear if the rotatable rotor housing should come into contact with the stationary casing. The bearing material may basically be made of any material whatever, or of several different materials, but preferably a material or materials which are wear resistant. The bearing material may be applied to the permanent magnets in a suitable fashion, for example by spraying, gluing etc.

The sets of permanent magnets which are arranged round the entire or parts of the rotatable rotor housing's and the stationary casing's circumference consist of a number of separate, discrete permanent magnets, where the separate, discrete permanent magnets are placed one behind the other in one or more rows. Two adjacent permanent magnet units in a set of permanent magnets may then be arranged so that they are in contact with one another, or they may also be arranged with a gap between them.

The permanent magnets may also be provided as larger units, where the permanent magnet covers the whole area which has to be covered by the permanent magnets, for example the area from 145 to 215 degrees.

The permanent magnets which are arranged round the external circumference of the rotatable rotor housing and round the internal circumference of the stationary casing are preferably arranged located immediately above one another when viewed in section in the propeller unit's longitudinal direction (axial direction), but may also conceivably be slightly displaced laterally relative to one another.

Furthermore, the permanent magnets may be arranged over the whole or parts of the rotor housing's and/or the casing's axial dimension. In a preferred embodiment of the present invention the permanent magnets are arranged in the rotor housing's and the casing's front and rear edge, i.e. in the area which forms the rotor housing's and the casing's openings.

The permanent magnets which are arranged round the rotatable rotor housing and the stationary casing may be provided with the same dimensions (i.e. thickness, length, width), or they may have different dimensions. The permanent magnets may furthermore be designed in such a manner that round the circumferences of the rotatable rotor housing and/or the stationary casing they have different dimensions in special areas of the circumferences, for example the permanent magnets in the casing may be of greater thickness in the area between 145 degrees and 215 degrees.

It is also possible for the permanent magnets to be composed of several layers of permanent magnets located above and in contact with one another.

A further possibility is that the distance between one or more of the sets of permanent magnets which are arranged on the rotatable rotor housing and one or more of the sets of permanent magnets which are arranged in the stationary casing may also vary. For example, the distance between the sets of permanent magnets may be greater in a lower point of the rotor housing in the propeller unit's mounted position.

The permanent magnets may be attached in a suitable manner to the rotor housing and the stationary casing, for example by gluing, by the permanent magnets being placed in holders, which are then attached to the rotor housing/the stationary casing, etc.

The bearing device according to the present invention seeks to avoid or at least reduce disadvantages of the already existing solutions.

Other advantages and special features of the present invention will become apparent from the following detailed description, the attached drawings and the following claims.

The invention will now be described in greater detail with reference to the following figures, in which FIG. 1 illustrates a propeller unit according to the present invention, FIG. 2 illustrates a section of a propeller unit comprising the bearing device in FIG. 1, FIG. 3 illustrates an embodiment of the bearing device according to the present invention, and FIG. 4 illustrates further details of the bearing device according to the present invention.

Figure 1:
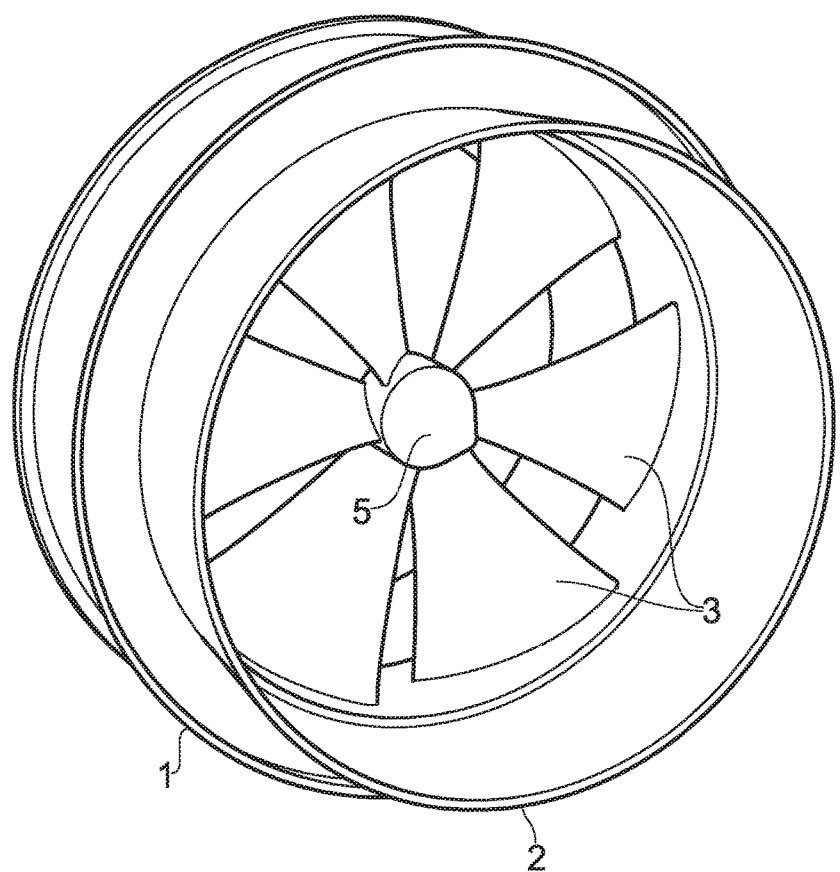

In FIG. 1 a propeller unit according to the present invention is illustrated, where the propeller unit comprises an external, stationary casing 1 and a rotatable rotor housing 2. The external, stationary casing 1 is securely mounted in a suitable manner to a vessel (not shown), so that the casing 1 forms a stationary unit with the vessel. The rotatable rotor housing 2 is mounted internally in the external, stationary casing 1, where the rotor housing 2 is composed of a number of propeller blades 3 and a propeller hub 5. The propeller blades 3 are securely connected to the rotatable rotor housing 2 through the propeller hub 5 and the rotatable rotor housing's 2 internal circumference. The rotor housing's 2 external diameter is smaller than the stationary casing's 1 internal diameter, with the result that when the external, stationary casing 1 and the rotatable rotor housing 2 are assembled, a gap will be created between the rotating rotor housing's 2 external circumference and the external, stationary casing's 1 internal circumference, where this gap is used for support of the rotatable rotor housing 2 relative to the external, stationary casing 1.

Figure 2:
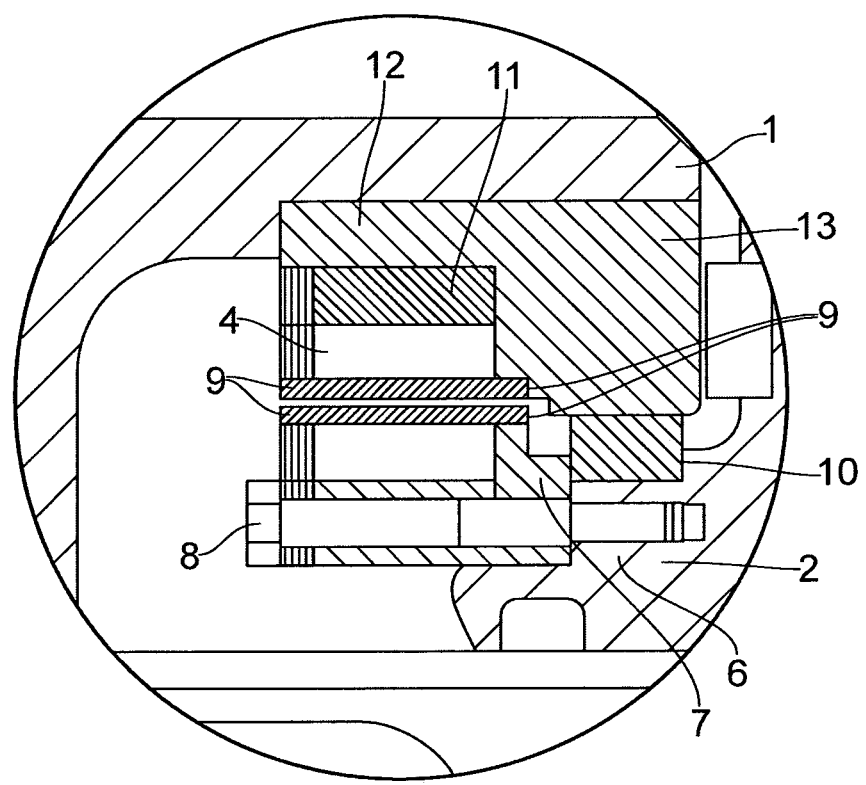

This is illustrated in FIG. 2, where a collar 13 is provided round the external circumference of the rotatable rotor housing 2, which collar 13 includes a cutout 11. In this cutout 11 a set of permanent magnets 4 are arranged. The permanent magnets 4 consist of a number of separate, discrete permanent magnet units, where these are arranged one after the other in a row round the entire or parts of the circumference of the cutout. In the figure the permanent magnets 4 are attached to the collar 3 by means of a connecting piece 10.

The external, stationary casing 1 is closed at one end, this end being provided with a flange 6 which protrudes inwardly in the stationary casing's 2 axial direction. A magnet holding device 7 is attached to the flange 6 via a bolt 8. In this magnet holder 7 a second set of permanent magnets 4 is arranged, consisting of a number of permanent magnet units. The permanent magnet units may be arranged round the entire or parts of the circumference of the flange 6.

When the rotatable rotor housing 2 is mounted in the external, stationary casing 1, the two sets of permanent magnets 4 in the rotatable rotor housing 2 and the external, stationary casing 1 will be arranged located directly above one another.

In FIG. 2 for the sake of simplicity only one end (section) of the propeller unit is shown. It should be understood, however, that the permanent magnets 4 will be arranged in a similar manner on the propeller unit's opposite side. However, the external, stationary casing 1 will not be closed in its opposite end to that illustrated in FIG. 2, which will permit easy assembly of the external, stationary casing 1 and the rotatable rotor housing 2. When the external, stationary casing 1 and the rotatable rotor housing 2 are assembled, the rotatable rotor housing 2 can be held in place in the external, stationary casing 1 by means of one or more locking devices. The locking device(s) may, for example, be in the form of a locking ring, flanges or the like, this or these being attached in a suitable manner internally in the external, stationary casing 1. Any sets of permanent magnets 4 which are provided between the two ends of the propeller unit will only be arranged (without the use of flanges, cutouts, etc.) round the rotatable rotor housing's 1 external circumference and the external, stationary casing's 1 internal circumference. This may be accomplished, for example, by the permanent magnets 4 being connected in a suitable manner to the rotatable rotor housing 2 and the external, stationary casing 1, for example by gluing.

Figure 3:
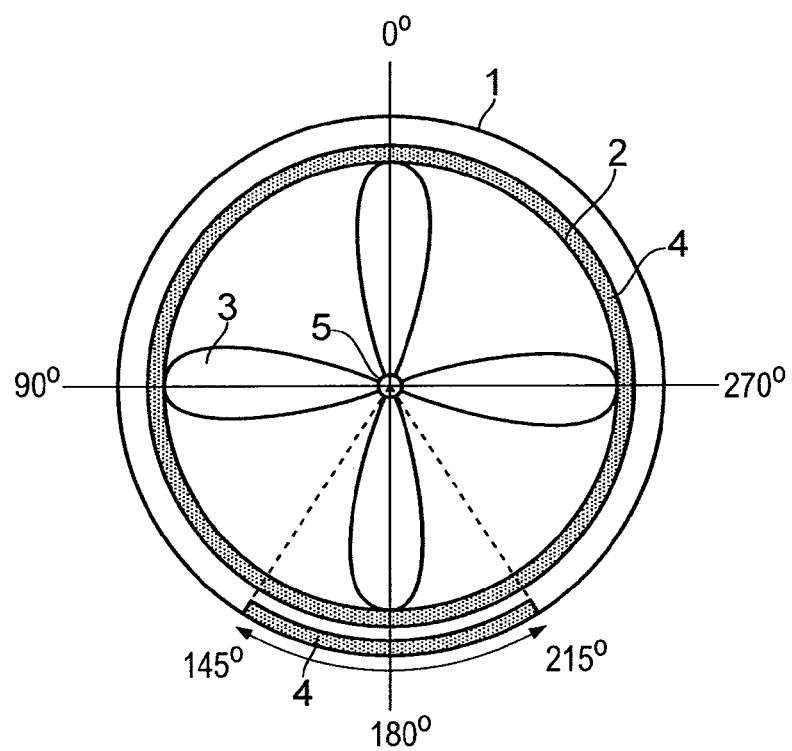

In the embodiment in FIG. 3 the permanent magnets 4 are only provided in an area between 145 degrees and 215 degrees of the external, stationary casing's 1 internal circumference, where zero degrees is defined as corresponding to a top point on the rotatable rotor housing 2 in the propeller unit's mounted position, while permanent magnets 4 are provided round the entire external circumference of the rotatable rotor housing 2. The permanent magnets 4 which are arranged on the external, stationary casing's 1 internal circumference, in the area between 145 degrees and 215 degrees will have the same polarity as the permanent magnets 4 which are arranged round the rotatable rotor housing's 1 external circumference, with the result that the permanent magnets 4 in the external, stationary casing 1 and the rotatable rotor housing 2 will attempt to repel one another in this defined area. The rotatable rotor housing 2 will therefore come into contact with the external, stationary casing 1 in this area to a far lesser extent.

The permanent magnets' 4 facing surfaces are furthermore covered by a bearing material 9 (see FIG. 2), where this bearing material 9 is more resistant to wear then the permanent magnets 4 are. The bearing material 9 can be applied to the permanent magnets' 4 surfaces by spraying or gluing.

A second bearing 10, which may be made of the same material as the bearing material 9, is provided between the stationary casing's 1 flange 6 and the rotor housing's 2 collar 13.

Figure 4:
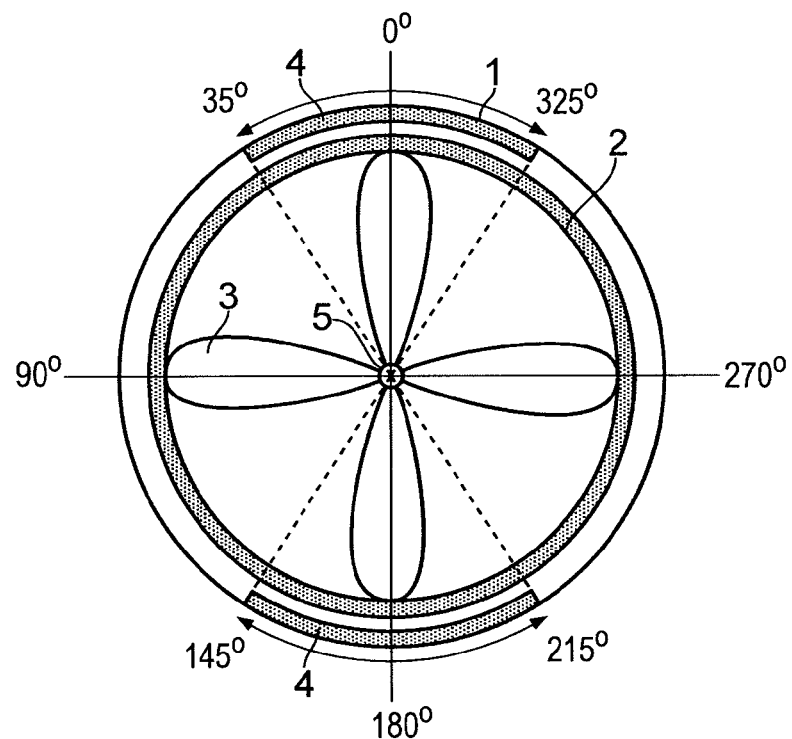
Figure 5A:
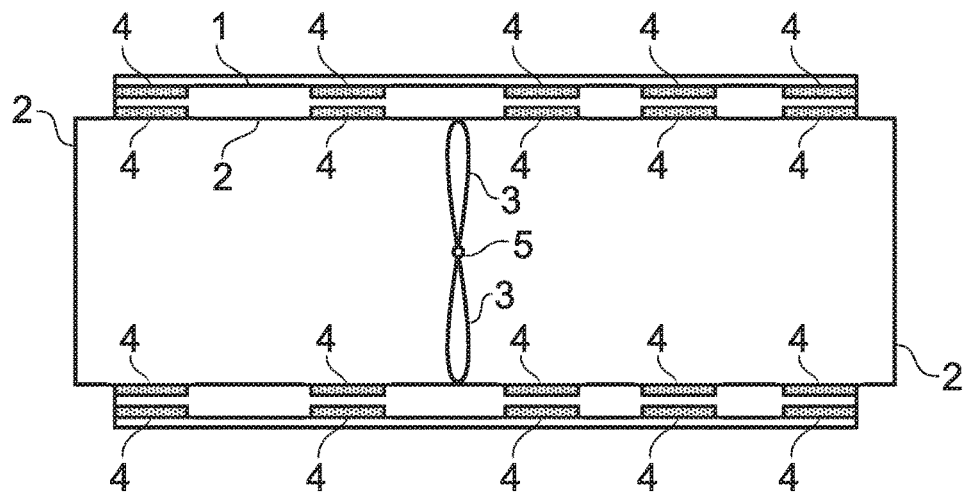
FIG. 5A is a side cross sectional view of the propeller
Figure 5B:
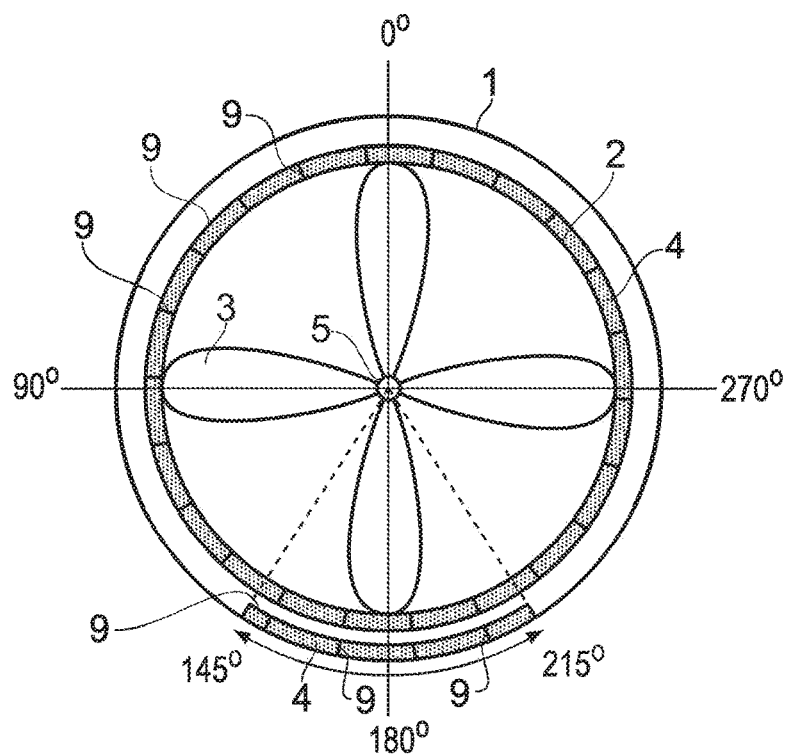
FIG. 5B is a front cross sectional view of the propeller

In FIG. 4 a second embodiment of the present invention is illustrated, where it can be seen that the permanent magnets 4 in the external, stationary casing 1 are now arranged in two areas round the rotatable rotor housing's 2 external circumference, namely in an area between 35 degrees and 325 degrees and in the area between 145 degrees and 215 degrees, where zero degrees is defined as corresponding to a top point on the rotatable rotor housing 2 in the propeller unit's mounted position. In a similar manner to that in FIG. 2, permanent magnets 4 are arranged round the entire external circumference of the rotatable rotor housing 2. The permanent magnets 4 which are arranged on the external, stationary casing's 1 internal circumference, in the area between 145 degrees and 215 degrees, will have the same polarity as the permanent magnets 4 which are arranged round the external circumference of the rotatable rotor housing 1, with the result that the permanent magnets 4 in the external, stationary casing 1 and the rotatable rotor housing 2 will attempt to repel one another in this defined area. Thus the rotatable rotor housing 2 will come into contact with the external, stationary casing 1 in this area to a far lesser extent.

The permanent magnets 4 which are arranged on the external, stationary casing's 1 internal circumference between 35 degrees and 325 degrees will have opposite polarity to the permanent magnets 4 which are arranged round the rotatable rotor housing's 1 external circumference, with the result that the permanent magnets 4 in the external, stationary casing 1 and the rotatable rotor housing 2 will attempt to attract one another in this area.

The effect of this embodiment will be that the permanent magnets in the external, stationary casing 1 and the rotatable rotor housing 2 will attract one another in the area between 35 degrees and 325 degrees, while the permanent magnets in the area between 145 degrees and 215 degrees will repel one another.

The invention has now been explained by means of several non-limiting embodiments. A person skilled in the art will appreciate that it will be possible to implement a number of variations and modifications of the propeller unit as described within the scope of the invention, as it is defined in the attached claims.

The invention claimed is:

1. A bearing device in a rim driven propeller unit for a vessel, which propeller unit comprises an external, stationary casing and a rotatable rotor housing mounted therein containing a number of propeller blades,
   wherein the bearing device comprises at least one set of permanent magnets arranged around an entire external circumference of the rotatable rotor housing, which permanent magnets are influenced by at least one set of permanent magnets arranged in an area between 145 degrees and 215 degrees, where zero degrees is defined as being the top point on the rotor housing in the propeller unit's mounted position, of an internal circumference of the external, stationary casing, and surfaces of the permanent magnets are covered by a bearing material.

2. A bearing device according to claim 1,
   wherein the permanent magnets arranged round the external circumference of the rotatable rotor housing and the internal circumference of the external, stationary casing, in at least the area between 145 degrees and 215 degrees, are of the same polarity.

3. A bearing device according to claim 1,
   wherein the sets of permanent magnets round the external circumference of the rotatable rotor housing and the internal circumference of external, stationary casing are arranged above one another located in the rim driven propeller unit's mounted position.

4. A bearing device according to claim 2,
   wherein an area between 35 degrees and 325 degrees of the internal circumference of the external, stationary casing, where zero degrees is defined as corresponding to the top point on the rotor housing in the propeller unit's mounted position, is provided with permanent magnets with different polarity to the permanent magnets arranged round the external circumference of the entire rotor housing.

5. A bearing device according to any one of claims 1-2 and 4,
   wherein a set of permanent magnets is composed of a number of separate permanent magnet units.

6. A bearing device according to any one of claims 1-2 and 4,
   wherein a set of permanent magnets is composed of a single permanent magnet.

7. A bearing device according to claim 1,
   wherein the bearing material is provided on facing surfaces of the permanent magnets.

8. A bearing device according to claim 1,
   wherein the bearing material is provided on lateral surfaces of the permanent magnets.

9. A bearing device according to claim 1,
   wherein the permanent magnets are arranged over the entire or parts of the external, stationary casing's and the rotatable rotor housing's axial dimension.

10. A bearing device according to claim 1,
wherein the permanent magnets round the rotatable rotor housing and the external, stationary casing have the same thickness, when viewed in a cross section of the permanent magnets.

* * * * *